Oct. 9, 1956  E. HARTMANN ET AL  2,765,824
PORTABLE POWER OPERATED SAW
Filed April 10, 1952  4 Sheets-Sheet 4

INVENTORS
ERIC HARTMANN
WALTER A. PAPWORTH
BY Bodell & Thompson
Attorneys

United States Patent Office 2,765,824
Patented Oct. 9, 1956

2,765,824
PORTABLE POWER OPERATED SAW

Eric Hartmann and Walter A. Papworth, Syracuse, N. Y., assignors to Porter-Cable Machine Company, Syracuse, N. Y., a corporation of New York Application April 10, 1952, Serial No. 281,580

2 Claims. (Cl. 143—159)

This invention relates to portable power operated hand saws of the type employing a circular saw blade, and the invention has to do more particularly with a guard structure for saws of that type.

These saws consist of a housing in which a motor is mounted, the motor being operatively connected, usually through gearing, to a saw arbor shaft to effect rotation of the circular saw blade. The housing is mounted upon a base plate and is adjustable toward and from the plate to vary the extent to which the lower portion of the circular saw blade is exposed to thereby vary the depth of the cut, and usually the housing is adjustable about a horizontal axis relative to the base plate in order to perform cuts at an angle. A saw of the type referred to is disclosed in Patent No. 1,848,330, issued March 8, 1932, to A. N. Emmons.

In saws of this type, the upper portion of the circular saw blade is enclosed by a guard of semi-circular form fixedly mounted on the housing. The lower portion of the saw blade depending below the base plate of the saw and which engages the work piece with a cutting operation, is usually enclosed by a second guard member of arcuate or semi-circular form, which is engaged by the work piece and moved out of normal position against the action of some yielding force, such as a spring, to expose the lower portion of the blade and thus permit a cutting operation to be performed.

This invention has as an object a power operated hand saw of the type referred to embodying a novel guard structure which functions to more completely and effectively enclose the saw blade when the device is not performing the cutting operation and which functions to more effectively reduce the hazard in using the saw.

The invention consists in the novel features and in the combinations and constructions hereinafter set forth and claimed.

In describing this invention, reference is had to the accompanying drawings in which like characters designate corresponding parts in all the views.

Figure 2:
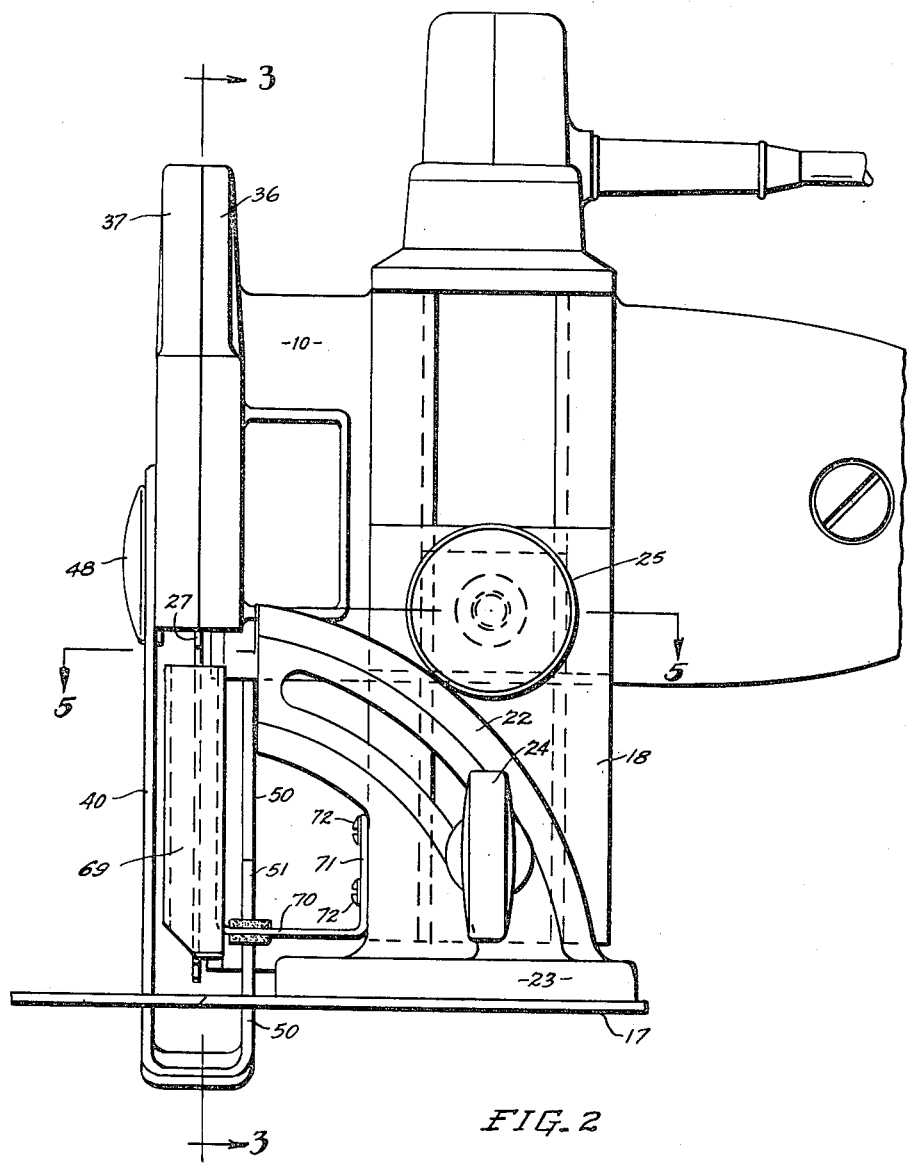
Figure 2 is an end elevational view looking to the left, Figure 1.

The saw comprises a housing 10 (Fig. 2) of substantially cylindrical formation and having a pair of spaced apart vertically extending flat surfaces 11 (Figs. 2 and 5) arranged at the forward portion of the housing, and the confronting edges of these spaced surfaces 11 are formed with a T slot to receive the head 12 of the bolt 13. The flat surfaces join a horizontally extending flattened portion at 14 to which the forward portion 15 of a handle 16 is secured. The housing is supported by a member 18 (Figs. 2 and 5) engaging the surfaces 11 and having a rib 20 positioned in the T slot formation. The member 18 is formed at its lower portion with an arcuate slot to receive a curved rib formed on the back surface of the arcuate bracket 22, the base portion 23 of which is fixedly secured to the base plate 17. The member 18 is detachably clamped to the arcuate bracket 22 by a thumb screw 24. The bolt 13 extends forwardly through an aperture in the member 18 and has threaded on its outer end a knob 25 which, in conjunction with the T head bolt 13, forms a clamp for clamping the member 18 against the vertical surfaces 11 of the housing 10. With this arrangement, the housing 10 can be elevated upwardly from the base plate 17, as illustrated in Figure 2. It can be raised to any desired extent and clamped by the knob 25. In like manner, the saw blade 27 can be tilted in angular relation to the base plate on the arcuate bracket 22, and clamped in adjusted position by the thumb screw 24.

The saw blade 27 is mounted on the conventional saw arbor shaft 30 (Figs. 3 and 4) which is journalled in the housing and connected to a motor also mounted in the housing, the saw blade being clamped between collars 31, 32, by means of a cap screw 33 threading into the outer end 34 of the arbor shaft. The periphery of the saw blade 27 is indicated by the dot and dash line 35, Figure 1.

The upper portion of the saw blade is enclosed in a fixed guard mounted on the housing 10. In the structure shown this guard consists of an inner semi-circular portion 36 formed integral with the housing, and a mating outer semi-circular member 37 affixed to the portion 36, as by screws 38. The lower portion of the saw blade is normally enclosed by a swing guard 40 journalled on the outer wall member 37 of the fixed guard on an axis coincident to the axis of the arbor shaft 30. The guard 40 is formed with a relatively large aperture encircled by an annular member or bushing 41 (Fig. 4) formed of wear resisting material such as steel, the outer wall portion 38 being cast about the bushing 41, whereby it is fixedly attached to the guard wall 37. A sleeve 42 is rotatably mounted in the ring 41 and is formed with a radial flange 43, Figure 4, overlying the outer face of the member 41. The inner end of this member 42 is provided with a snap ring 44. The guard 40 is likewise cast about the forwardly extending portion 47 of the sleeve 42 whereby the guard becomes fixedly secured to the sleeve 42. The sleeve 42 is arranged in registration with the arbor shaft 30 and provides a work opening through which the cap screw 33 may be removed to permit removal of the saw blade 27 from the arbor shaft. The aperture formed by the sleeve is provided with a closure 48 detachably secured therein. The guard 40 is formed with an inner wall 50 shaped as shown in Figure 3, and provided at its forward end with a portion 51 extending inwardly toward the saw arbor.

Figure 1:
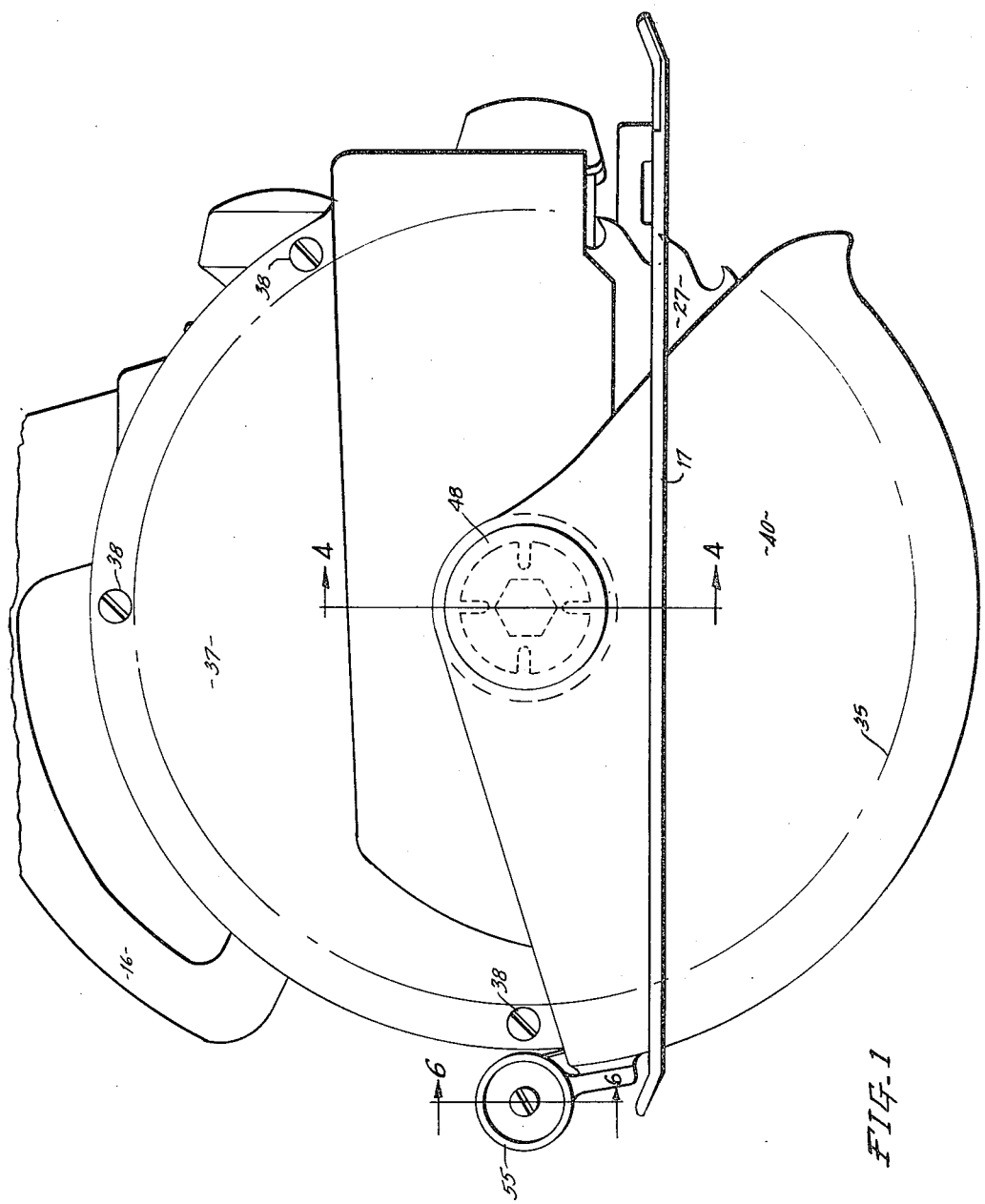
Figure 1 is a side elevational view of a power saw embodying our invention.
Figure 3:
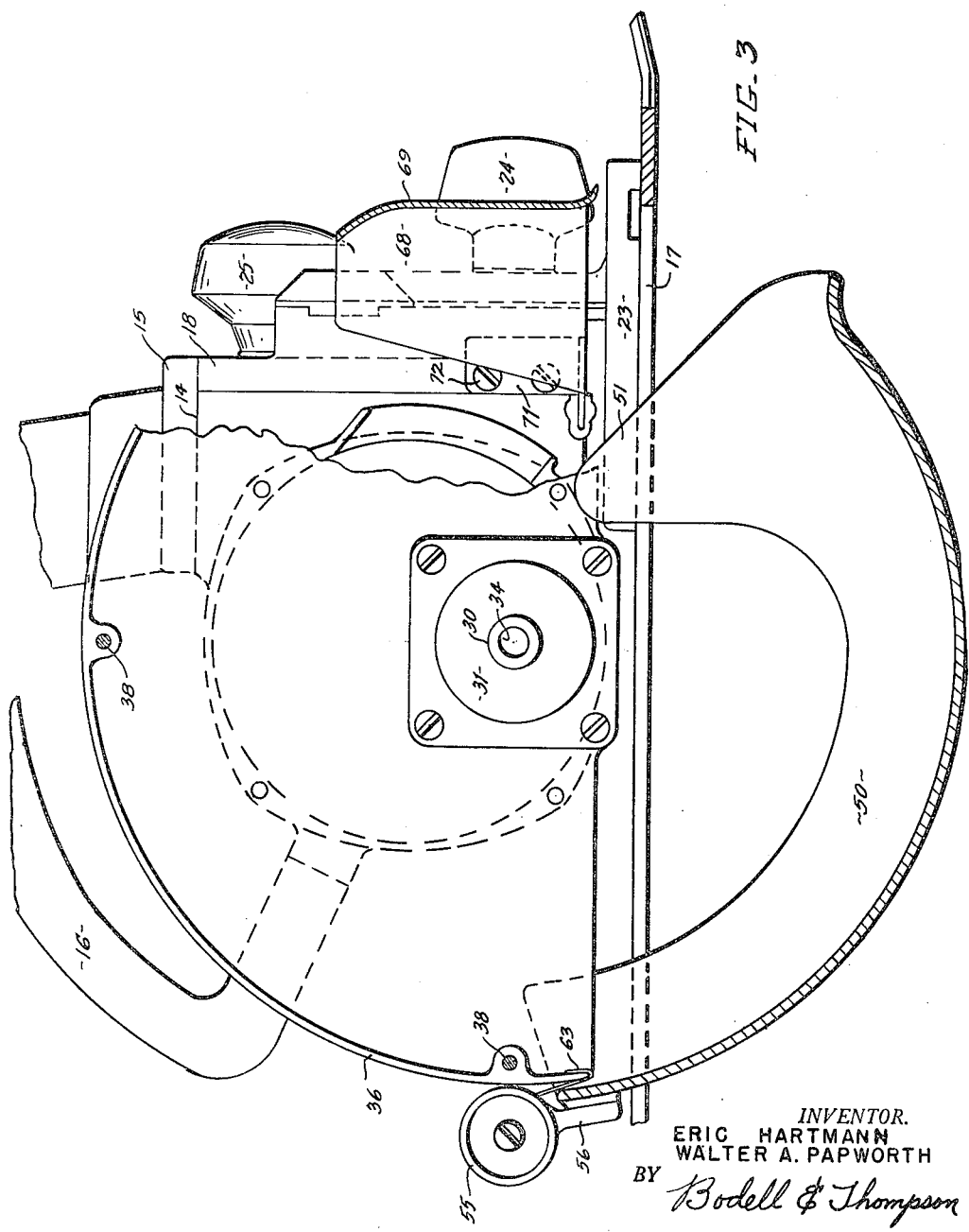
Figure 3 is a view taken on line 3—3, Figure 2, with a portion of the inner side of the fixed guard broken away.
Figure 4:
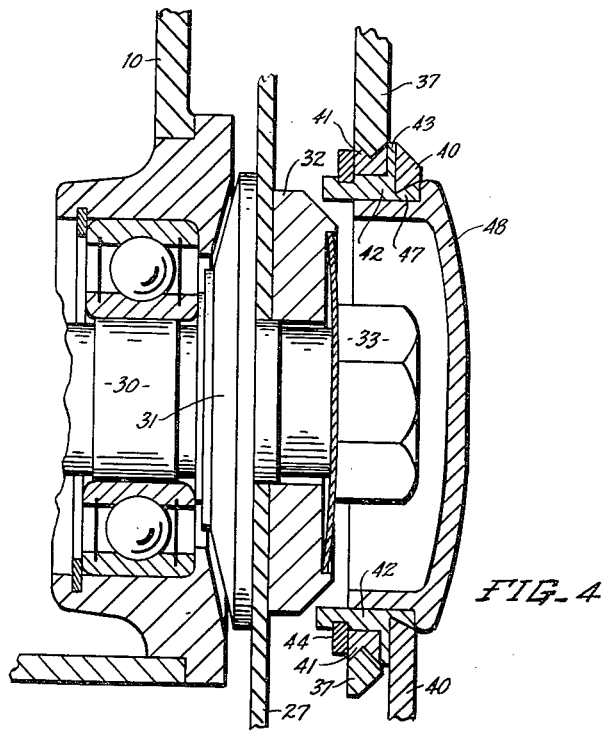
Figure 4 is a view taken on a line corresponding to line 4—4, Figure 1.

When the saw is moved forwardly on the work piece, the forward portion of the guard 40 is engaged by the work piece and the guard is moved in a clockwise direction, Figures 1 and 3, as the saw advances through the work piece, the swing guard 40 telescoping over the fixed guard, the radius of the outer wall of the swing guard being somewhat greater than the radius on which the fixed guard is formed so that there is a space between the guards during the swinging movement of the guard 40. The purpose of the inwardly extending portion 51 of the swing guard is to effect engagement with the work piece when a narrow strip is being sawed from the work piece—that is, a strip is being sawed which is of less width than the distance between the outer wall of the guard 40 and the inner wall 50.

Figure 6:
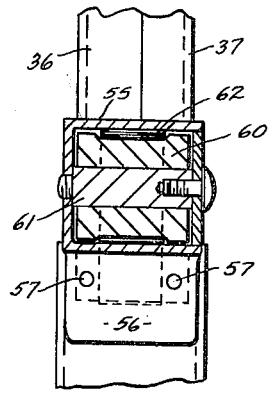
Figure 6 is a view taken on line 6—6, Figure 1.

The swing guard 40 is provided at its rear end with a cylindrical housing 55. The housing is formed with a radially extending projection 56 (Figs. 3 and 6) positioned on the guard 40 and attached thereto, as by screws or rivets 57. A spool 60 is mounted in the housing 55 for rotation upon a stud 61. A coil spring 62 is mounted on the spool 60 with the outer end portion 63 of the spring fastened to the lower rear end of the fixed guard, see Figures 3 and 6. The spring 62 is of the type that exerts a uniform force regardless of the extent to which it is unwound from the spool 60. The spring 62 functions to yieldingly urge the guard 40 to the position shown in Figures 1 and 3 to engage the lower portion of the saw blade 27. Accordingly, when the swing guard is rotated by contact with the work piece, the movement of the guard is against the action of the spring 62 and at the conclusion of the cutting operation, the spring serves to quickly swing the guard back into blade enclosing position.

It will be observed that in operations where it is necessary to first manually open the guard 40 for exposure of the blade 27, as in cutting in from the surface of the work, the cylindrical housing 55 provides a convenient handle for swinging the guard 40 about its pivotal mounting and in such manual manipulation of the guard, the operator's fingers are remote and safe from the cutting teeth of the saw blade.

As previously explained the housing 10, including the guard structure carried thereby, is movable vertically relatively to the base plate 17 to vary the depth of the cut produced by the blade 27. In Figure 2, the housing has been elevated whereby the lower edge of the fixed guard is spaced upwardly a considerable distance from the base plate 17 and which would normally permit a considerable portion of the blade 27 to be exposed.

Figure 5:
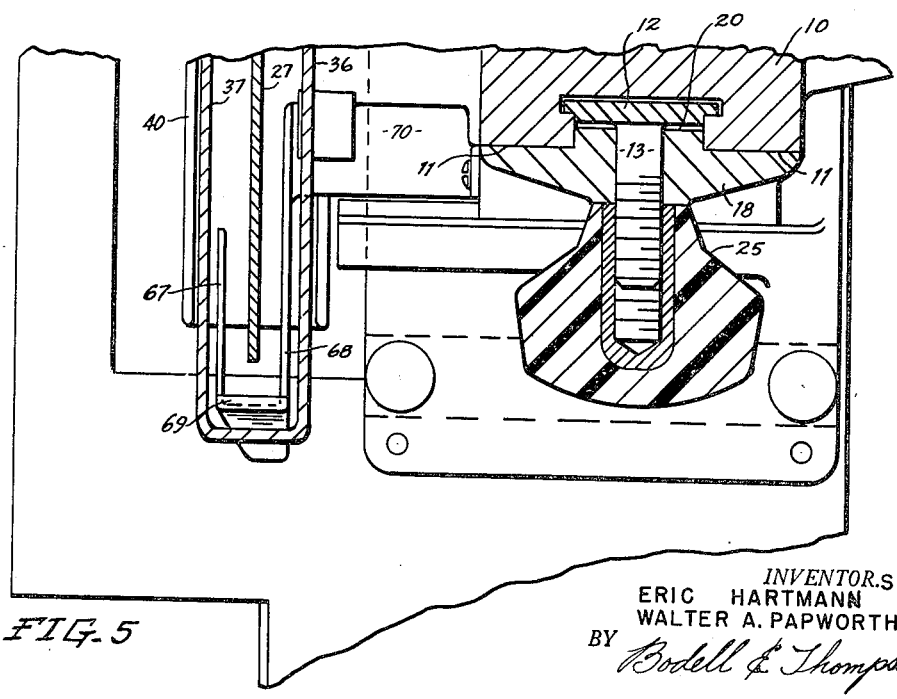
Figure 5 is a view taken on line 5—5, Figure 2.

A third guard member is provided to guard the forward portion of the saw blade above the base when the housing is elevated. This guard consists of a U-shaped member having an outer wall 67, and an inner wall 68, these walls being connected by a forward wall portion 69 (Figs. 3 and 5). The inner wall 68 is formed, or provided, with a bracket 70 (Fig. 2) extending inwardly and having an upturned portion 71 abutting against the edge of the member 18 and being fixedly secured thereto, as by screws 72. It will be recalled that the member 18 is not movable vertically relative to the base plate 17, but only movable on the arcuate bracket 22 about an axis substantially at the inner section of the saw blade and the base plate 17. Accordingly, this guard member does not move during vertical adjustment of the housing 10 and therefore forms an enclosure for the forward portion of the saw blade.

In the event the guard 40 becomes bent, or otherwise damaged, it may be quickly and conveniently removed by simply removing the snap ring 44. The sleeve or bushing 42 consists of an integral part of the guard, the guard and sleeve being removed as a unit. This permits convenient replacement of the guard. It will be observed that the spring 62 is positioned externally of the upper fixed guard and therefore, is not susceptible to being gummed up by resin, tar from artificial roofing or siding, or by wet sawdust. With the spring arrangement described, the pressure tending to move the guard 40 to closed position is uniform, or unchangeable, regardless of the position of the guard.

In prior guard structures, the actuating spring is mounted upon the body of the machine, or connected between the motor housing and the movable guard and the tension of the springs vary, or become greater, as the guard is opened, causing the movable guard to bear on the work piece with considerable pressure and causing the guard to slam shut at the end of the saw but, this hammer action being detrimental to the guard structure.

What we claim is:

1. A portable power operated hand saw comprising a housing, a motor mounted in the housing, a saw blade arbor shaft journalled in the housing and being operatively connected to the motor, a fixed guard of semi-circular form carried by the housing and enclosing the upper portion of the saw blade, a swing guard of semi-circular form journalled on an axis coincident with the axis of said arbor shaft, said swing guard being formed with a peripheral portion movable exteriorly of the rear portion of said fixed guard, and said swing guard being normally arranged to cover the lower portion of the saw blade and being movable about said axis upon engagement with the work piece to expose the lower portion of the saw blade, a spring housing fixed on the peripheral portion of said swing guard remote from the work engaging portion and also exteriorly thereof, a coil spring mounted in said spring housing and having an end portion extending through said spring housing connected to the portion of said fixed guard within said swing guard, said spring being operable to yieldingly urge said swing guard to blade covering position.

2. A portable power operated hand saw comprising a housing, a motor mounted in the housing, a saw blade arbor shaft journalled in the housing and being operatively connected to the motor, a fixed guard of semi-circular form carried by the housing and encircling the upper portion of the saw blade, a swing guard of semi-circular form journalled on an axis coincident with the axis of said arbor shaft, said swing guard being formed with a peripheral portion movable exteriorly of the rear portion of said fixed guard, said swing guard being normally arranged to cover the lower portion of the saw blade and being movable rearwardly about said axis upon engagement of the work piece with the forward edge of said swing guard, said swing guard having a spring housing positioned above and exteriorly of the upper rear edge of said swing guard, a spool journalled for rotation in said housing, a coil spring mounted on said spool and having an end portion extending through said housing and connected to the rear lower edge of said fixed guard, said spring being operable to yieldingly urge said spring guard to blade covering position.

References Cited in the file of this patent

UNITED STATES PATENTS

| Number | Name | Date |
|---|---|---|
| 733,744 | Raettig | July 14, 1903 |
| 1,623,290 | Wappat | Apr. 5, 1927 |
| 1,701,948 | Crowe | Feb. 12, 1929 |
| 1,806,528 | Fegley et al. | May 19, 1931 |
| 1,848,330 | Emmons | Mar. 8, 1932 |
| 1,850,444 | Brumell | Mar. 22, 1932 |
| 1,858,459 | Ramey | May 17, 1932 |
| 1,900,553 | Hampton | Mar. 7, 1933 |
| 2,488,947 | Varrik | Nov. 22, 1949 |
| 2,543,486 | Briskin | Feb. 27, 1951 |
| 2,544,461 | Leitzel | Mar. 6, 1951 |